June 19, 1951 J. L. HIGHT 2,557,105
SHOCK ABSORBING CRASH FRAME FOR AERIAL DELIVERY
OF CARGO AND VEHICLES
Filed Aug. 30, 1950
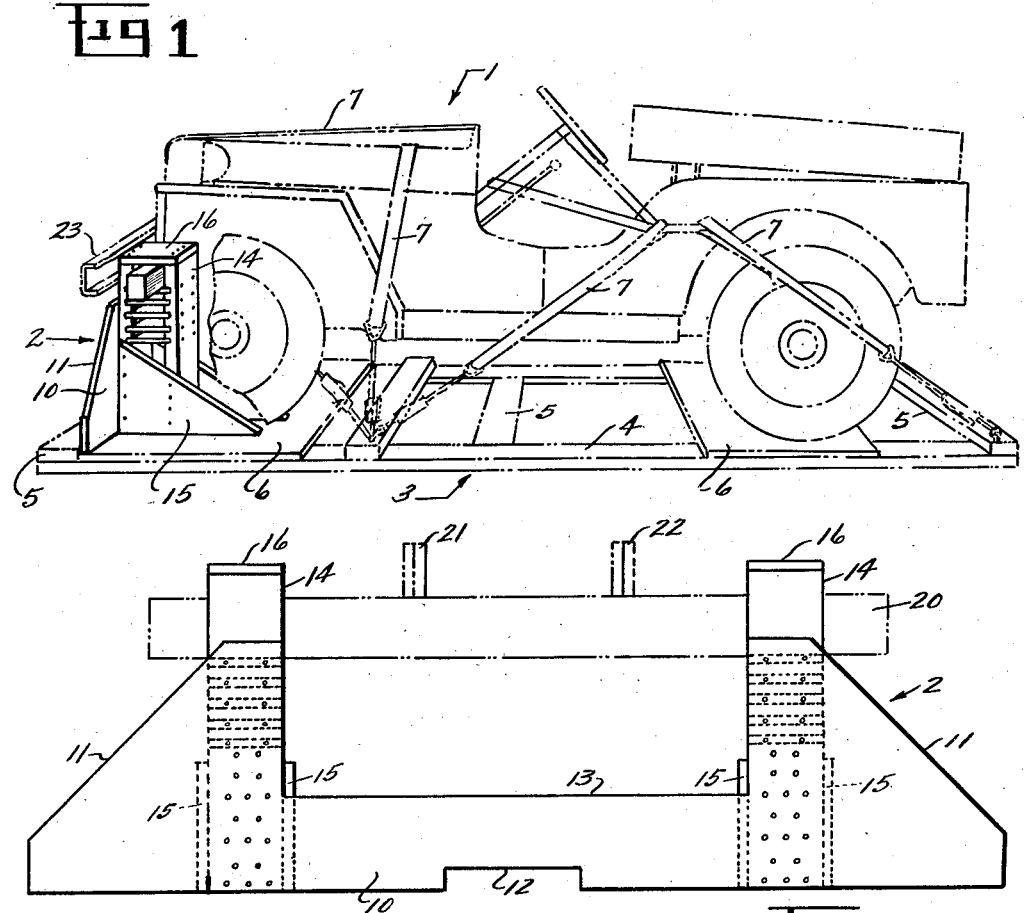
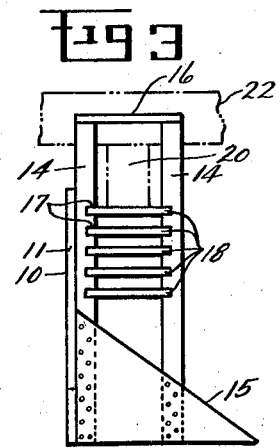
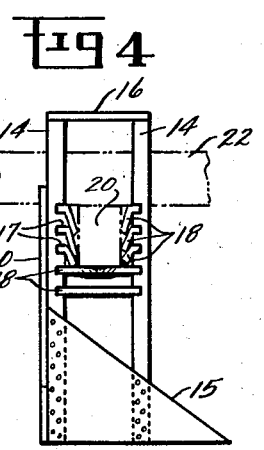
INVENTOR.
JAMES L. HIGHT
BY Wade Koonts
ATTORNEY
Charles L. Burgoyne
AGENT

UNITED STATES PATENT OFFICE 2,557,105

SHOCK ABSORBING CRASH FRAME FOR AERIAL DELIVERY OF CARGO AND VEHICLES

James L. Hight, Dayton, Ohio

Application August 30, 1950, Serial No. 182,389

3 Claims. (Cl. 244—138)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a shock absorbing crash frame for the aerial delivery of cargo and vehicles and particularly relates to such a crash frame having frangible plate elements to take up landing shocks.

The principal object of the invention is to provide a simple low-cost device or apparatus for positioning under a spring supported weight, such as a vehicle body, to absorb the inertia forces of the weight on landing after a parachute supported fall.

A further object of the invention is to provide a frame assembly adapted to be positioned on a flat surface adjacent to a vehicle body or other spring supported weight and including a plurality of spaced apart horizontal plates to take up the inertia force of the body on landings incident to aerial delivery thereof and in which the plates act independently in succession to take up or absorb a portion of the inertia force before fracture.

Another object of the invention is to provide a low-cost frame assembly including frangible plate elements and supports therefor and to provide such a frame assembly suitable for absorbing large impact loads even though the frame is entirely of wood or plywood construction except for nails and other fastenings.

Another object of the invention is to provide a shock absorbing crash frame for use in the aerial delivery of cargo and vehicles and gun carriages wherein the frame includes a supporting structure adapted to removably receive frangible plate elements to take up shock loads and fracture or bend in taking up the loads but which are replaceable by other unfractured plate elements to restore the shock absorbing crash frame to its original condition for repeated use in aerial delivery operations incident to warfare, rescue operations and delivery to land areas unsuited for aircraft landing fields.

The above and other objects of the invention will become apparent upon reading the following detailed description in conjunction with the accompanying drawing, in which:

Fig. 1 is a perspective view taken from one side of a small vehicle lashed to a delivery platform and having the present crash frame installed under the forward end of the vehicle body.

Fig. 2 is a front elevation view of the present shock absorbing crash frame.

Fig. 3 is a side view of the present shock absorbing crash frame.

Fig. 4 is a side view of the crash frame after several of the plate elements have broken or fractured in taking up a shock load.

A development in the aerial delivery of heavy cargo now makes possible the delivery by parachute of complete vehicles and howitzers mounted on delivery platforms. Upon landing, the vehicles and field pieces are thus ready for immediate operation without assembly of various sections and components. In delivering vehicles and other assemblies including spring supported bodies it has been found that additional shock absorbing devices must be used to decelerate the spring supported bodies when the vehicles are suddenly stopped upon reaching the ground. The vehicle springs not being designed to absorb shocks of the magnitudes involved, these auxiliary shock absorbers must be used or the vehicle springs and undercarriage will be damaged.

Referring now to Fig. 1 there is shown a small motor vehicle 1 which has been made ready for aerial delivery thereof. Because of the concentration of weight near the forward end of the vehicle only one crash frame 2 is used and it is positioned under the front end and mostly between the front wheels. The vehicle and crash frame are supported on a platform 3 made of longitudinal planks 4 joined together by transverse planks 5. Heavy plywood floor pieces 6 also extend across the platform under the front and rear wheels of the vhicle. Very substantial lashings 7 of textile webbing are used to anchor the vehicle body onto the platform. While the rear wheels of the motor vehicle are shown in contact with the floor section 6, it is preferable to support the front end of the vehicle body by the present crash frame at such an elevation that the front wheels will be held off the floor of the platform. Then upon landing the crash frame will take up the major portion of the shock load and by the time the front wheels engage the floor of the platform the downward movement of the vehicle body will be almost completely arrested. The strain on the wheels, wheel suspension and springs will thus be minimized. It is to be understood that additional crash frames may be used under the vehicle body depending on its weight, weight distribution and calculated speed of fall.

The shock absorbing crash frame 2 comprises a main transverse frame member 10 of planar form and preferably made of plywood, such as three-quarter inch five-ply fir plywood. The opposite ends extend the full width of the platform and may be cut off at an angle, as indicated at 11. The under side is notched out at 12 to allow free passage of a load ejection cable or webbing which pulls the loaded platform out of a load carrying airplane, having a fuselage open at the rearward end and having a roller-type conveyor or track on the fuselage floor. The upper side of the upright member 10 is cut out as at 13 so as not to interfere with the free downward movement of the vehicle body and frame. At each end of the frame member 10 is a pair of uprights 14, such as common two by fours, which are joined by triangular plywood plates or gussets 15 nailed or otherwise secured to the uprights. The uprights having their flat sides against the frame member 10 are nailed thereto and the upper ends of the uprights of each pair are joined by tie plates 16.

At the confronting face sides of the uprights 14 there are provided spaced apart grooves or kerfs 17 of just the right thickness to receive a spaced apart series of frangible plates 18, preferably of plywood. A suggested thickness for the plates 18 is one-half inch for use in arresting small vehicles but for heavier vehicles and gun carriages this thickness may be increased very substantially. The plates 18 may be secured in the grooves 17 by nails if desired but their replacement by new plates is facilitated if no retaining means are used. Extending across the uppermost plates 18 is a load transferring beam member 20 providing an extensive span between the associated pairs of upright members 14 to engage the load whose downward movement must be arrested.

In the presently illustrated example the vehicle 1 includes forwardly extending frame extensions 21 and 22 which support a conventional bumper 23. These frame parts are supported on the upper face of the beam 20, so that the sudden stopping of the platform and vehicle on contact with the ground after a parachute fall causes the inertia load of the vehicle body to be transferred from the frame extensions 21 and 22 to the uppermost plate member 18. In practice these plate members will break by bending action thus absorbing part of the inertia load so that the beam 20 will then engage the next pair of plate members 18. This same action will be repeated until the downward force of the vehicle body is spent. As seen in Fig. 4 the final condition may be one in which three out of five plates have broken through completely and a fourth plate is badly cracked. Plywood seems to be ideally suited for use in this shock absorbing action, since it has considerable resistance to bending stress and also because it will not result in any rebound action. For these reasons the present shock absorbing crash frame is superior to spring devices or other arresting gear which are usually more complicated, more expensive and heavier. As indicated above the present crash frame may be reused time after time by replacement of the plate members 18. For greater stability of the frame, the support member 10 and 15 may be nailed to the floor section 6 is desired. With each different type of vehicle or load, consideration must be given to the part thereof which will be engaged with the beam member 20 but with military vehicles the ruggedness of construction lends itself to easy solution of this problem.

In parachuting a loaded platform to the ground from a cargo airplane many details are involved but these details are not necessary to a clear understanding of the present invention. The load carrying parachutes are secured to the load and to the platform and the loaded platform becomes stabilized in a horizontal position before it nears the ground. The rate of descent is such, however, that the present crash frame or some equivalent thereof is absolutely necessary to prevent damage to the vehicle springs and undercarriage when the platform is suddenly stopped by contact with the earth. In practicing the invention various changes and modifications may be made where desired. For instance the frame member 10 need not necessarily connect the two pairs of upright members but the construction shown is preferred because the device may be installed or removed more quickly if made in one rigidly connected assembly. There are various other kinds of materials which may be used for the plates 18 besides plywood. For instance they may be made of laminated plastic sheet materials or solid wood, such as oak, fir or cypress.

The embodiments of the invention herein shown and described are to be regarded as illustrative only and it is to be understood that the invention is susceptible of modifications and variations within the scope of the appended claims.

I claim:

1. A shock absorbing crash frame for use in absorbing vertically applied impact loads comprising, at least one pair of spaced upright members, providing confronting side faces, means providing a plurality of horizontal vertically spaced grooves in said confronting side faces at equal levels above the lower ends of said upright members, frangible plates having opposite edges located in said grooves and spanning said upright members in horizontal positions, and means initially resting on the uppermost one of said frangible plates and adapted to transfer impact loads from a vertically falling cargo to said frangible plates one at a time on sudden deceleration of said cargo.

2. A shock absorbing crash frame for use in absorbing vertically applied impact loads comprising, at least one pair of spaced upright members providing confronting side faces, means supporting said upright members in vertical position, means rigidly connecting said upright members, means providing a plurality of horizontal vertically spaced grooves in said confronting side faces at equal levels above the lower ends of said upright members, plywood plates having opposite edges located in said grooves and spanning said upright members in horizontal positions, and means initially resting on the uppermost one of said plywood plates and adapted to transfer impact loads from a vertically falling cargo to said plywood plates one at a time on sudden deceleration of said cargo.

3. A shock absorbing crash frame for use in absorbing vertically applied impact loads comprising, means providing two similar pairs of spaced upright members each pair providing confronting side faces and said pairs being spaced apart a substantial distance, means providing a plurality of horizontal vertically spaced grooves in said confronting side faces at equal levels above the lower ends of said upright members, frangible plates having opposite edges located in said grooves and spanning the upright members of each pair thereof in horizontal positions, a transverse frame member rigidly secured to each of said pairs of spaced upright members, and a load transferring beam member extending from one pair of upright members to the other pair for engagement with upper surfaces of the uppermost of said frangible plates.

JAMES L. HIGHT.

REFERENCES CITED

The following references are of record in the file of this patent:

UNITED STATES PATENTS

| Number | Name | Date |
|---|---|---|
| 197,398 | O'Neil | Nov. 20, 1877 |
| 2,404,673 | Volf | July 23, 1946 |
| 2,454,616 | Schultz | Nov. 23, 1948 |
| 2,457,205 | Campbell | Dec. 28, 1948 |

FOREIGN PATENTS

| Number | Country | Date |
|---|---|---|
| 18,213 | Great Britain | of 1911 |